(12) United States Patent
Seedorf (10) Patent No.: US 8,640,819 B2
(45) Date of Patent: Feb. 4, 2014

(54) ENCLOSURE, ASSEMBLY AND METHOD FOR REDUCING NOISE FROM A PUMP AND MASS SPECTROMETRY SYSTEM

(75) Inventor: Ronald Seedorf, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 12/460,630

(22) Filed: Jul. 22, 2009

(65) Prior Publication Data

US 2010/0116583 A1    May 13, 2010

(30) Foreign Application Priority Data

Nov. 13, 2008    (GB) .................................. 0820794.6

(51) Int. Cl.
*G10K 11/16*    (2006.01)
(52) U.S. Cl.
USPC .......................................... 181/205; 417/312
(58) Field of Classification Search
USPC ............ 181/200, 202, 205; 250/181; 417/312
See application file for complete search history.

(56) References Cited

U.S. PATENT DOCUMENTS

| | | | | |
|---|---|---|---|---|
| 3,820,627 A | * | 6/1974 | Wirt | 181/225 |
| 3,963,094 A | * | 6/1976 | Nowikas | 181/198 |
| 4,508,486 A | | 4/1985 | Tinker | |
| 5,272,285 A | * | 12/1993 | Miller | 181/202 |
| 5,672,052 A | * | 9/1997 | Ishida et al. | 417/312 |
| 6,116,374 A | * | 9/2000 | Westerbeke, Jr. | 181/204 |
| 6,321,557 B1 | * | 11/2001 | Scrivener et al. | 62/296 |
| 6,810,989 B1 | * | 11/2004 | Dantlgraber et al. | 181/202 |
| 7,357,219 B2 | * | 4/2008 | Mafi et al. | 181/202 |
| 7,398,855 B2 | * | 7/2008 | Seel | 181/202 |
| 2006/0185931 A1 | * | 8/2006 | Kawar | 181/202 |
| 2007/0102233 A1 | * | 5/2007 | Wang | 181/202 |

FOREIGN PATENT DOCUMENTS

| | | | | |
|---|---|---|---|---|
| FR | 2 729 494 A1 | | 7/1996 | |
| JP | 03253800 A | * | 11/1991 | F04D 29/66 |
| JP | 06250673 A | * | 9/1994 | G10K 11/16 |
| JP | 09195952 A | * | 7/1997 | F04B 53/00 |

OTHER PUBLICATIONS

Web archive of sonation.de, Noise reduction box SSH21 (Slencer) from Oct. 19, 2004, accessed May 21, 2012, <web.archive.org/web/20041019005243/http://www.sonation.de/en/ssh/sshmain.htm>.*
Alcatel, "Photo of Alcatel pump cover," probably manufactured before the 2006 merger of Alcatel and Lucent Technologies.

* cited by examiner

*Primary Examiner* — Jeremy Luks
(74) *Attorney, Agent, or Firm* — Nicholas Cairns; Charles B. Katz; Pamela Lau Kee (57) ABSTRACT

The invention provides a noise reducing enclosure for reducing the noise from a vacuum pump, e.g. a roughing pump of a high vacuum system, the vacuum pump having a long axis and the enclosure comprising a noise dampening material and being shaped to radially enclose the vacuum pump along its long axis and being axially open at each end. Airflow is permitted through the enclosure in use and optional integrated cooling means on the pump may assist cooling of the pump. The invention also provides an assembly of the pump and enclosure, a method for reducing the noise from a vacuum pump using the enclosure and a mass spectrometry system comprising: a mass spectrometer having one or more chambers therein which in operation are held under vacuum; and a vacuum pumping system for producing said vacuum, the vacuum pumping system comprising at least one vacuum pump which has a long axis and wherein the mass spectrometry system further comprises a noise reducing enclosure for radially enclosing the vacuum pump along its long axis, wherein the enclosure is axially open at each end.

14 Claims, 10 Drawing Sheets

ENCLOSURE, ASSEMBLY AND METHOD FOR REDUCING NOISE FROM A PUMP AND MASS SPECTROMETRY SYSTEM

FIELD OF THE INVENTION

The invention relates generally to an enclosure, an assembly and a method for reducing noise from a vacuum pump, as well as a mass spectrometry system.

BACKGROUND OF THE INVENTION

Certain types of vacuum pump in both industrial and laboratory environments generate a considerable amount of noise thereby making working conditions in their vicinity less comfortable. Examples of pumps which are in particular need of noise reduction include roughing pumps, i.e. pumps employed to achieve a low vacuum, e.g. typically not less than $1 \times 10^{-3}$ mbar. Roughing pumps are often used in combination with higher vacuum pumps, e.g. turbomolecular pumps. Many types of higher vacuum pumps do not work well at atmospheric pressure so that a roughing pump is needed to provide a low vacuum in which the higher vacuum pump can work to achieve the higher vacuum. Rotary pumps, e.g. rotary vane pumps, are commonly used roughing pumps in need of noise reduction. Other types of roughing pump in need of noise reduction include, without limitation, roots pumps, piston pumps, scroll pumps, membrane pumps and the like. Roughing pumps typically form a part of a vacuum pumping system for a mass spectrometer.

Noise reducing enclosures for roughing pumps currently on the market comprise a box in which the pump is completely enclosed. Such enclosures are available, for example, from Sonation GmbH (as described on their website at www-.sonation.de) and MS Noise (as described on their website at www.msnoise.com). The enclosures are designed to enclose pumps in a laboratory setting, e.g. pumps of mass spectrometry systems. The pump noise is reduced but the box is necessarily bulky, complex and costly because sufficient ventilation must be provided with the box to prevent overheating of the pump. The ventilation is provided by fans, which require a power supply (thereby adding to the total power consumption) and maintenance and they are a source of noise themselves. The box must also be adapted in order to allow feed through of the necessary power, vacuum and exhaust lines to the pump inside. Moreover, full enclosure by the box makes the pump harder to reach which, in turn, makes maintenance of the pump more difficult.

In view of the above background, the present invention has been made.

STATEMENT OF THE INVENTION

According to an aspect of the present invention there is provided a noise reducing enclosure for reducing the noise from a vacuum pump, the vacuum pump having a long axis, wherein the enclosure comprises a noise dampening material and is shaped to radially enclose the vacuum pump along its long axis and is axially open at each end.

According to another aspect of the present invention there is provided an assembly for reducing the noise from a vacuum pump, the assembly comprising a vacuum pump having a long axis and a noise reducing enclosure radially enclosing the vacuum pump along its long axis, the enclosure comprising a noise dampening material and being shaped to radially enclose the vacuum pump along its long axis and being axially open at each end.

According to still another aspect of the present invention there is provided a method for reducing the noise from a vacuum pump, the vacuum pump having a long axis, the method comprising radially enclosing the vacuum pump along its long axis within a noise reducing enclosure which comprises a noise dampening material and is axially open at each end. The method of the invention is preferably carried out using the noise reducing enclosure and the assembly according to the present invention.

According to yet another aspect of the present invention there is provided a mass spectrometry system comprising: a mass spectrometer having one or more chambers therein which in operation are held under vacuum; and a vacuum pumping system for producing said vacuum, the vacuum pumping system comprising at least one vacuum pump which has a long axis and wherein the mass spectrometry system further comprises a noise reducing enclosure for radially enclosing the vacuum pump along its long axis, wherein the enclosure is axially open at each end.

Advantageously, it is has been found that the present invention effectively reduces the noise of the pump using an extremely simple, low-cost enclosure. The enclosure may be made easily and cheaply from simple, readily available materials, e.g. from sheet metal or plastic and a noise absorbent material or from a single noise absorbent material moulded to a suitable shape in a single process.

The invention has been found to be effective with, for example, roughing pumps. The invention is effective with such roughing pumps as rotary pumps. Such pumps typically have an elongate shape and have a motor means and a pumping means arranged along the longitudinal or axial direction of the elongate shape. Cooling of the pump is typically provided by a cooling fan located at the back of the pump and connected to the motor, which generates airflow along the pump and optional cooling ribs. Without the scope of the invention being limited by any theory, it appears that the invention works because the noise is not emitted evenly around the pump body but rather it seems that noise emission occurs predominantly in the radial direction from the pump body (i.e. perpendicular to the long axis) with correspondingly less noise emission in the long axis direction, i.e. axially from the ends of the pump. The invention therefore succeeds in effectively reducing noise because the enclosure radially encloses the pump along its long axis thereby enclosing the surfaces of the pump from which the majority of the noise emanates.

The present invention has another advantage in that no additional openings may be required in the enclosure for, e.g. power, vacuum inlet and exhaust outlet, which instead may be feed through the open ends of the enclosure.

The oil level window present on many roughing pumps is typically on the front end of the pump (i.e. at one of the ends of the longitudinal axis) and so can be easily viewed using the present invention without any need for removal of a cover.

The present invention is arranged such that a cooling fan of typical pumps, located at the rear of the pump, is in communication with the outside air such that airflow along the pump is thereby substantially unhindered and possibly even improved. Accordingly, no additional cooling is required, in contrast to the prior art noise reduction boxes which require additional cooling fans.

DETAILED DESCRIPTION OF THE INVENTION

It will be appreciated that herein the reference to a pump does not limit the scope of the present invention to one pump only but instead it means at least one pump, e.g. two or more pumps may be enclosed by the enclosure. In the case of enclosure of two or more pumps, the pumps may be located in any arrangement with respect to each other (e.g. in-line (end-to-end), side-by-side, or any other arrangement). The pump which is enclosed by use of the present invention is preferably a roughing pump. The vacuum typically achievable in use by the roughing pump is a low vacuum, e.g. of pressure not less than $1\times10^{-3}$ mbar, preferably not less than $1\times10^{-4}$ mbar. The roughing pump is typically a rotary pump. Examples include a rotary vane pump, a roots pump and a rotary piston pump. Other types of roughing pump include a scroll pump, a membrane pump and the like. Such pumps include pumps made by manufacturers such as Edwards and Leybold, for example. Specific pump models include, without any limitation: E2M28 and E2M30 rotary vane pumps available from Edwards; TRIVAC™ single and dual stage rotary vane pumps, SCREW LINES dry pumps, SOGEVAC® single stage rotary vane pumps, and RUVAC® roots booster pumps, all available from Leybold.

The vacuum pump to be enclosed may be a pump used on its own or it may be part of a larger vacuum system, e.g. it may be a roughing pump used in combination with a high vacuum pump, e.g. a turbomolecular pump. The high vacuum pump may be capable of achieving a high or ultra high vacuum. Such larger vacuum systems are employed in many different environments, including in the vacuum system of mass spectrometry instruments. The vacuum pump is preferably a part of a vacuum system for a mass spectrometer. The vacuum pump is preferably a roughing pump, e.g. of any of the types described above, which is a part of a vacuum pumping system for a mass spectrometer. Noise abatement in the environment of a laboratory where mass spectrometry systems are typically located is an important issue.

It will be appreciated that in the mass spectrometry system according to the present invention the type of mass spectrometer is unlimited and the invention is applicable with any mass spectrometer having one or more chambers therein which in operation are held under vacuum (e.g. quadrupole, ion trap, TOF, Orbitrap™ as well as any other mass spectrometers). The vacuum in the one or more chambers may be a low, medium, high or ultra-high vacuum. The vacuum pumping system is operably connected, directly or indirectly, to the one or more chambers of the mass spectrometer whereby the vacuum pumping system can produce said vacuum in said one or more chambers. The at least one vacuum pump which has a long axis is preferably a roughing pump, e.g. of any of the types described above. The vacuum typically achievable in use by the roughing pump is a low vacuum, e.g. of pressure not less than $1\times10^{-3}$ mbar, preferably not less than $1\times10^{-4}$ mbar. The roughing pump used in the mass spectrometry system is typically used in combination with a medium, high or ultra-high vacuum pump.

The pump to be enclosed, which is preferably a roughing pump and more preferably a rotary roughing pump, is preferably elongate, i.e. being longer in one direction (its length) than the other. Accordingly, the long axis of the pump is the axis running parallel to the pump's length. The enclosure radially encloses the pump along its long axis, i.e. in its longer dimension direction.

The elongate pump preferably has motor means connected to pumping means, the motor means and pumping means being arranged along its length, i.e. long axis. The pump preferably has integrated cooling means provided, e.g. comprising a cooling fan, located at one end of the pump (one end of the long axis), preferably connected to the motor means. The pump optionally has cooling ribs, e.g. formed into an outer casing of the pump. The cooling means preferably generate airflow along the pump length and over the optional cooling ribs.

The enclosure is typically elongate, and is axially open by having open ends at both ends of its length. In use, the length (and hence a long axis) of the enclosure lies in the same direction as the length (and hence the long axis) of the pump. The open ends of the enclosure are preferably located adjacent to the ends of the pump, i.e. at each end of the pump's length. The open ends of the enclosure are open in use, i.e. when the pump is working. Preferably, the ends of the pump are accessible in use, e.g. to view the oil level. The open ends are generally such that each open end has an open area which is at least 30% of the total area of the end. Preferably, the open ends are such that each open end has an open area which is at least 50%, more preferably at least 60%, and most preferably at least 70% of the total area of the end. The open area of each end, in some embodiments, may be at least 80% and, in particular embodiments, at least 90% of the total area of the end. The extent of the open area of the enclosure open ends may be optimised for a specific pump to be enclosed, e.g. the enclosure could have an open area that is at least the size of a cooling fan of the pump. The open area of the end is preferably positioned so that in use it approximately matches (i.e. overlays) the position of a pump end having an integrated cooling means, e.g. fan.

The open ends allow airflow freely therethrough, e.g. air can flow into the enclosure at one end and out of the other end. Advantageously, this may permit cooling of the pump. Advantageously, air need not be forced through or into the enclosure. Merely being open to the ambient air at its ends is typically sufficient cooling for the pump. This is especially so if the pump has its own built-in cooling means, e.g. a fan, arranged to blow air axially along the length of the pump. Preferably, the pump has built-in cooling means located at one end of the pump arranged to blow air axially along the length of the pump towards the other end of the pump. Most roughing pumps have integrated cooling fans. Additional fans or other cooling means are therefore not required with the invention and preferably the enclosure does not comprise any fans to cool the pump or the enclosure.

Preferably, the enclosure radially encloses the pump along substantially the whole of its length, i.e. it encloses the pump along the whole or nearly the whole of its length (i.e. the latter situation covers some cases where the pump may have one or both of its ends protruding a short distance from the ends of the enclosure whilst still having its noise significantly reduced). Preferably, however, the enclosure radially encloses the pump along the whole of its length, i.e. enclosure will be at least as long as, and even more preferably longer than, the pump so that the length of the enclosure overhangs the ends of the pump, thereby improving the noise reduction efficiency.

The pump, in use, is completely radially enclosed. In some embodiments, the enclosure itself may be radially continuous (i.e. being continuous in radial cross section), i.e. the enclosure itself may be shaped to completely radially enclose the pump, e.g. having a base, two side walls and a top wall or roof. However, the enclosure, by itself, need not be shaped to completely radially enclose the pump, i.e. the enclosure itself may be radially discontinuous (i.e. being discontinuous in radial cross section), for example, it may have an open side (instead of a base) by which the enclosure fits (i.e. locates) over the pump. This is advantageous in that occasional removal of the enclosure, as is required e.g. for access to the pump as part of normal operation, is thereby made easy and may be performed, e.g., with one simple motion. The enclosure of the present invention therefore has improved usability. In such cases, the enclosure engages with a support surface on which the pump is supported, the enclosure in engagement with the support surface thereby providing that the pump is completely radially enclosed. In other words the support surface functions as a base for the enclosure in such embodiments. The support surface may be any suitable surface, e.g. a floor, table, stand, tray or other surface. The support surface may be a specially designed, i.e. matching, support surface, e.g. a support surface having matching engagement means for engaging with the enclosure. Such engagement means may comprise a groove, track or the like, for example. The support surface may comprise an oil tray to catch oil spills from the pump.

The enclosure may have one or more sides (e.g. it may comprise three sides or it may comprise one curved side if in the form of, e.g., a bubble). The enclosure preferably has an open side (preferably at the base) by which the enclosure fits over the pump and engages with a support surface on which the pump is supported. The enclosure preferably has a generally U-shaped radial cross section (i.e. having three sides), more preferably having a top wall or roof and two side walls. The U-shaped enclosure may be a squared U-shape (i.e. having edges at right angles), a rounded U-shape (i.e. having rounded edges) or other variations on a U-shape (e.g. a U-shape having chamfered edges). The open side of the U-shape allows the enclosure to be fitted over the pump, with the ends of the side walls of the U-shape being for engagement with a support surface on which the pump is supported. The enclosure shape may be of one or more other forms, e.g. bubble shaped having a single curved wall and an open side for fitting over the pump.

The enclosure may be provided as a single piece or it may comprise two or more pieces which fit together, e.g. two separate side wall panels which fit to a separate roof panel. Preferably, the enclosure is provided as a single piece.

The enclosure is preferably of such dimensions to allow an air gap to exist around the periphery of the pump, i.e. between the pump and the inner surface of the enclosure. This permits air to flow through the enclosure and over the pump in use. The air gap is preferably in the range 1 cm to 20 cm, i.e. between the pump and the inner surface of the enclosure. In practice, the size of the air gap is preferably tailored to the size of the pump and the airflow which the pump may generate by itself (e.g. by the pump's own fan). The air gap can be surprisingly small and may even improve the cooling of the pump, instead of impeding it, because it helps to guide an airflow along the cooling means (e.g. cooling fan and/or cooling fins) provided on the pump.

The enclosure is preferably a self-supporting structure, by which is meant permanently self-supporting, e.g. not requiring inflation or other assistance in order to assume its operating shape. The enclosure is preferably non-collapsible, i.e. a permanent structure. This makes the enclosure more durable, easily removed from the pump when needed and essentially maintenance free.

The enclosure comprises a noise dampening material. The enclosure may be made from the noise dampening material alone (i.e. consist essentially of a noise dampening material), e.g. as a single moulded piece of the noise dampening material, or the enclosure may comprise an outer shell of a rigid, preferably durable, material such as sheet metal or plastic and have an inner lining of noise dampening material. The enclosure may comprise one or more other layers on either side of the aforementioned shell and lining as desired. The noise dampening material may comprise any suitable noise dampening material. The noise dampening material may be selected for general purpose, e.g. for use with a wide range of pumps with different noise characteristics or it may be selected specifically for a particular type of pump. Examples of suitable noise dampening materials include commercially available materials. Suitable classes of noise dampening materials include foam materials (e.g. polyethylene (PE) foams; polyurethane (PUR) foams; and melamine foams) and non-woven materials. Noise dampening foam materials and non-woven materials may be laminated with other materials, e.g. to improve strength, adhesion and/or noise dampening properties. Specific examples of noise dampening foam products include Cello™ D 2600 grade PE foam, Cello™ 451, 453, 460, 470, 471, 485, 487, 491, 521 and 615 grades of PUR foam, and Cello™ HR 290 grade melamine foam, all available from Cellofoam GmbH (www.cellofoam.de). PE foam such as Cello™ D 2600 is particularly suitable for nose reduction at low frequencies, e.g. around 500 Hz. Specific examples of noise dampening non-woven products include Cello™ F800 FR, also available from Cellofoam GmbH. Melamine foams and non-woven materials have wide applicability, including at high frequencies. Suitable noise dampening materials are preferably mechanically robust and oil and water resistant. In addition to the choice of the material, the thickness of the noise dampening material may be chosen to suit the level of dampening required. The thickness may, for example, be in the range 10-100 mm, e.g. about 50 mm. Commercial materials typically are sold in standard thicknesses, e.g. 10 mm, 20 mm, 30 mm, 40 mm and 50 mm.

The present invention may be used alone for noise reduction or it may be used in conjunction with other methods of noise reduction. The present invention may be used, for example, in conjunction with a system of active noise cancelling, e.g. to further reduce noise emitted from the open ends.

The invention will now be described in more detail by way of example only and with reference to the accompanying drawings in which.

It will be appreciated that the embodiments shown in the Figures are illustrative only and are not limiting on the scope of the invention.

Figure 1:
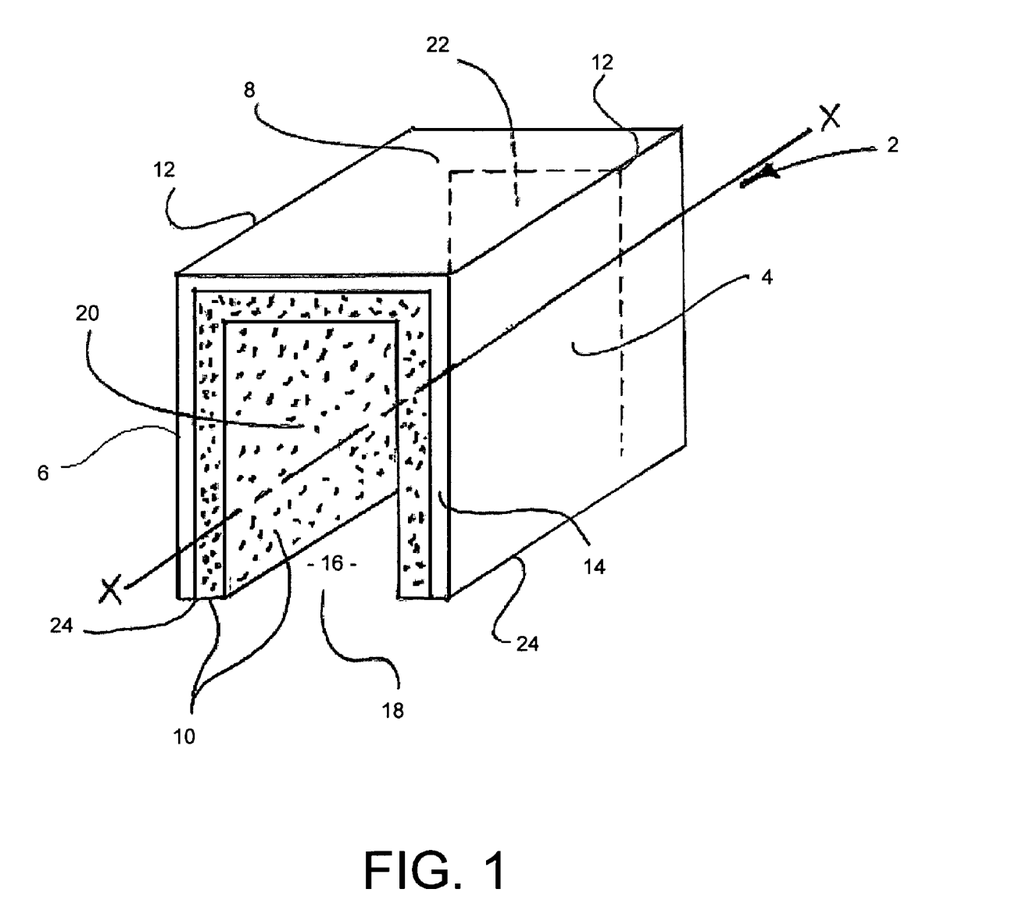
FIG. 1 shows a schematic perspective view of an embodiment of a noise reducing enclosure according to the present invention.

Referring to FIG. 1, there is shown an embodiment of a noise reducing enclosure according to the present invention configured as a squared U-shape. The enclosure 2 has a long axis X-X and comprises two side walls 4 and 6 and a roof 8, which meet at right angled edges 12. The side walls 4 and 6 and roof 8 each comprise an outer sheet material 14 of rigid aluminium sheet (thickness 2 mm). It will be appreciated that, alternatively, the outer sheet material 14 may be any suitable other sheet metal or plastic. In the case of sheet metal, the walls 4 and 6 and roof 8 may be formed by bending a single sheet of metal or they may be formed by securing together (e.g. by screws, weld or rivets) separate wall and roof panels. In the case of rigid plastic, the walls 4 and 6 and roof 8 may be moulded as a single piece or they may also be formed by securing together separate plastic wall and roof panels. The overall dimensions of the enclosure in this embodiment are:

Length (i.e. in the direction of the long axis X-X)=550 mm
Height (base to roof)=450 mm
Width (side to side)=460 mm The length of the enclosure 2 is slightly longer than the length of the vacuum pump which it is designed to enclose.

Figure 2:
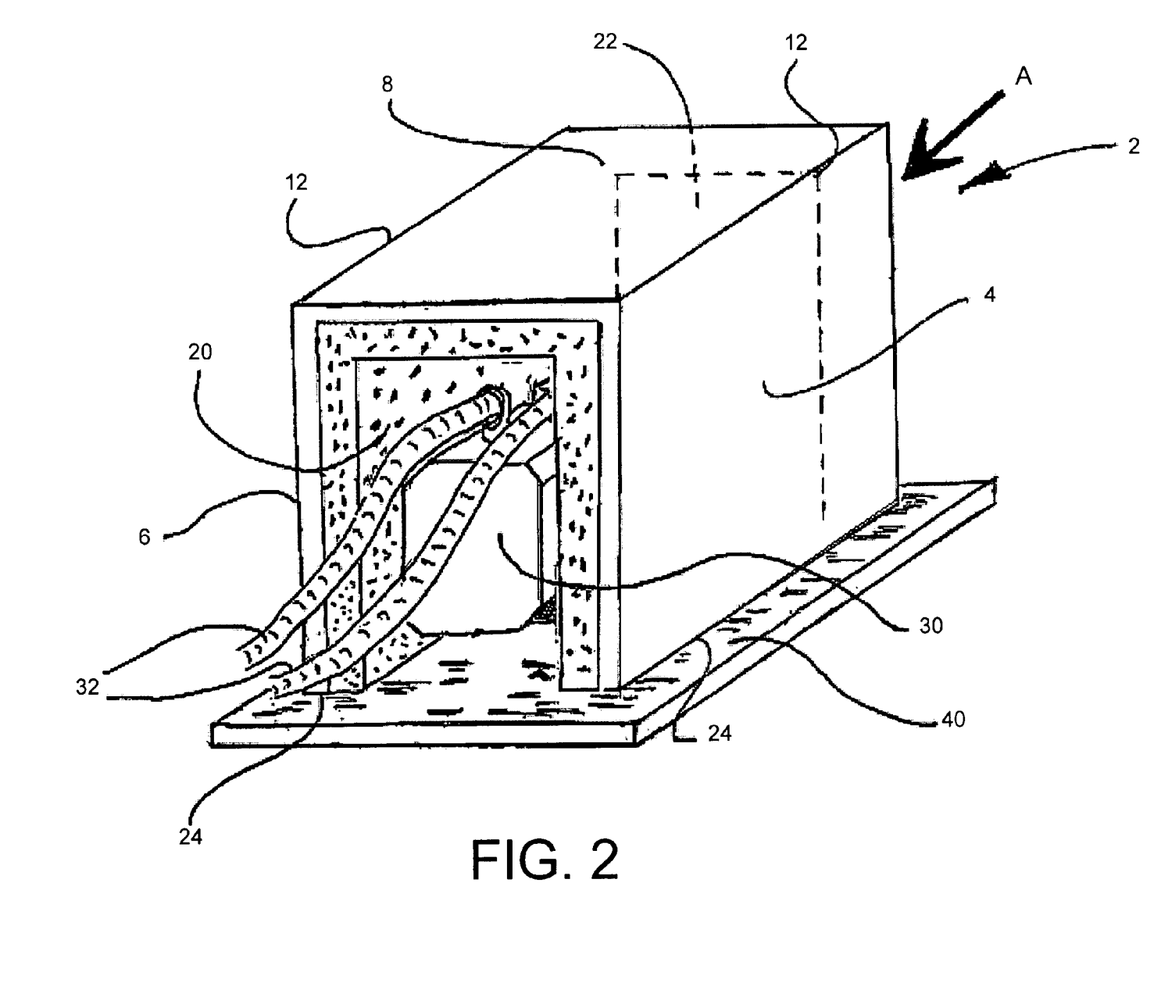
FIG. 2 shows a schematic perspective view of the noise reducing enclosure of FIG. 1 in use.
Figure 3:
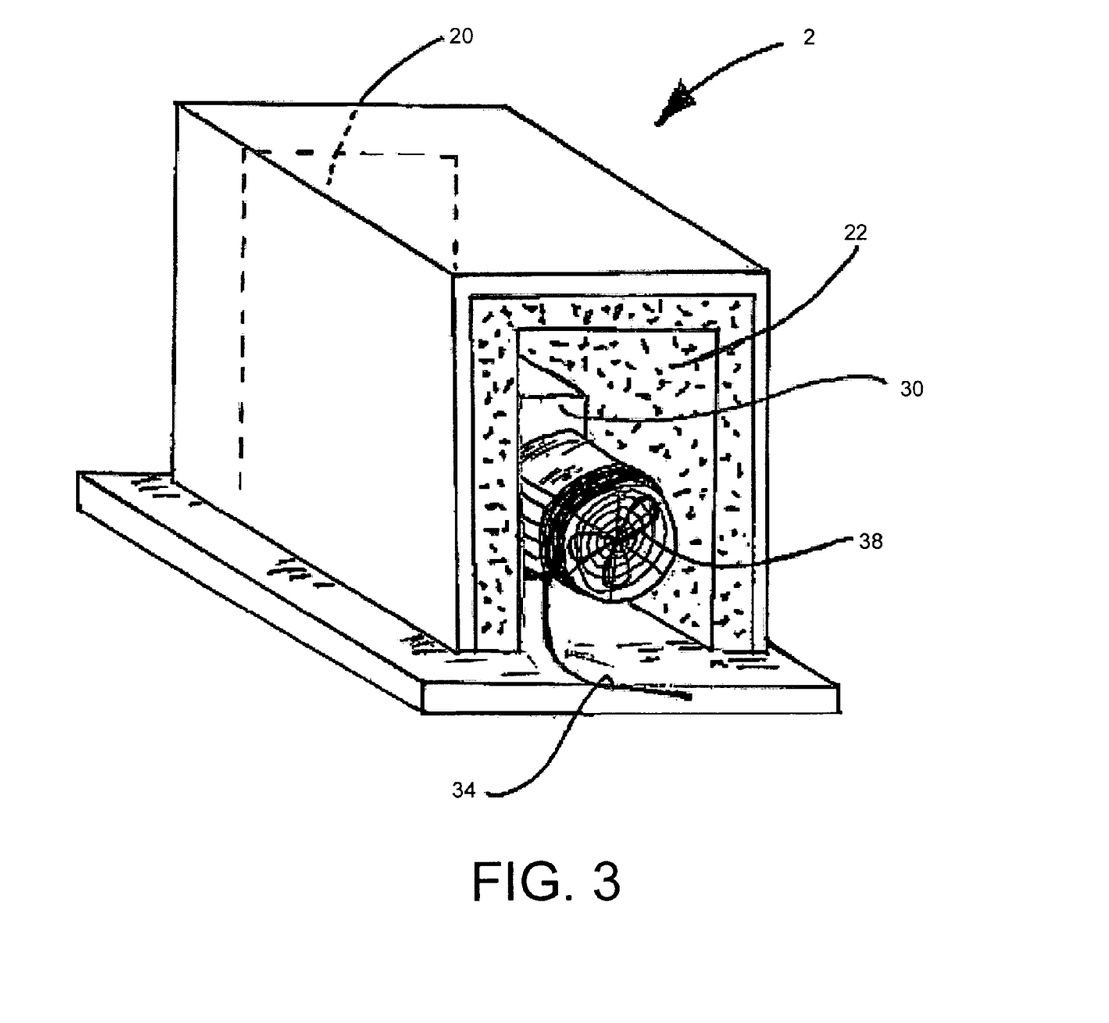
FIG. 3 shows a schematic perspective view of the noise reducing enclosure of FIG. 1 in use as in FIG. 2 viewed from the direction of arrow A.

The inner surfaces of the walls 4 and 6 and the roof 8 are bonded to an inner lining of noise dampening material 10 comprising 50 mm thick PUR foam sheet (Cello™ 470 SK available from Cellofoam GmbH). The U-shape of the enclosure defines therein a space 16 in which, in use, is accommodated the vacuum pump as shown in FIGS. 2 and 3. The enclosure has open axial ends 20 and 22 (the position of the open end 22 is shown in dotted outline in FIGS. 1 and 2) to allow air-flow through the space 16 defined within the U-shape.

As shown in FIG. 2, in use, the enclosure 2 is placed over a rotary vane vacuum pump 30 standing on a support platform 40 via the open bottom side 18 of the enclosure such that the vacuum pump 30 becomes radially enclosed within the space 16 of the enclosure. The pump 30 is of a type typically used as a roughing pump in a mass spectrometry vacuum system. The pump 30 has a long axis (not shown) which is parallel to the long axis X-X shown in FIG. 1. Bottom edges 24 of the enclosure engage with the platform 40 and between the enclosure and the support surface the pump becomes completely radially enclosed. It will be appreciated that the support platform 40 could be the floor or a specially designed support for the pump such as an oil tray to catch any oil spills from the pump or some other support surface. In embodiments, bottom edges 24 of the enclosure may be provided with a profile which engages with a matching profile on the surface of the support platform 40. For example, bottom edges 24 of the enclosure may be provided with one or more protrusions which engage with one or more matching recesses on the surface of the support platform 40. The vacuum and exhaust lines 32 can be fed through the open end 20 of the enclosure.

FIG. 3 shows the assembly of FIG. 2 in use viewed from the other end of the enclosure, i.e. in the direction of arrow A of FIG. 2. FIG. 3 shows the other end of the pump 30 visible through the other open end 22 of the enclosure 2. The pump power cable 34 can be fed through the open end 22 of the enclosure 2. The pump 30 has a fan 38 located at its end which blows air axially along the pump as a means of cooling the pump. The open ends 20 and 22 of the enclosure allow air to be drawn in from outside the enclosure 2 by the fan 38 via open end 22 and the blown air exits via the other open end 20. The enclosure 2 achieves significant dampening of the noise emitted by the pump whilst at the same time being simple and cheap, allowing cooling of the pump and providing easy access to the pump and feed through of vacuum and power lines.

In tests, the noise levels have been found to be reduced as shown in the Table below.

Figure 4:
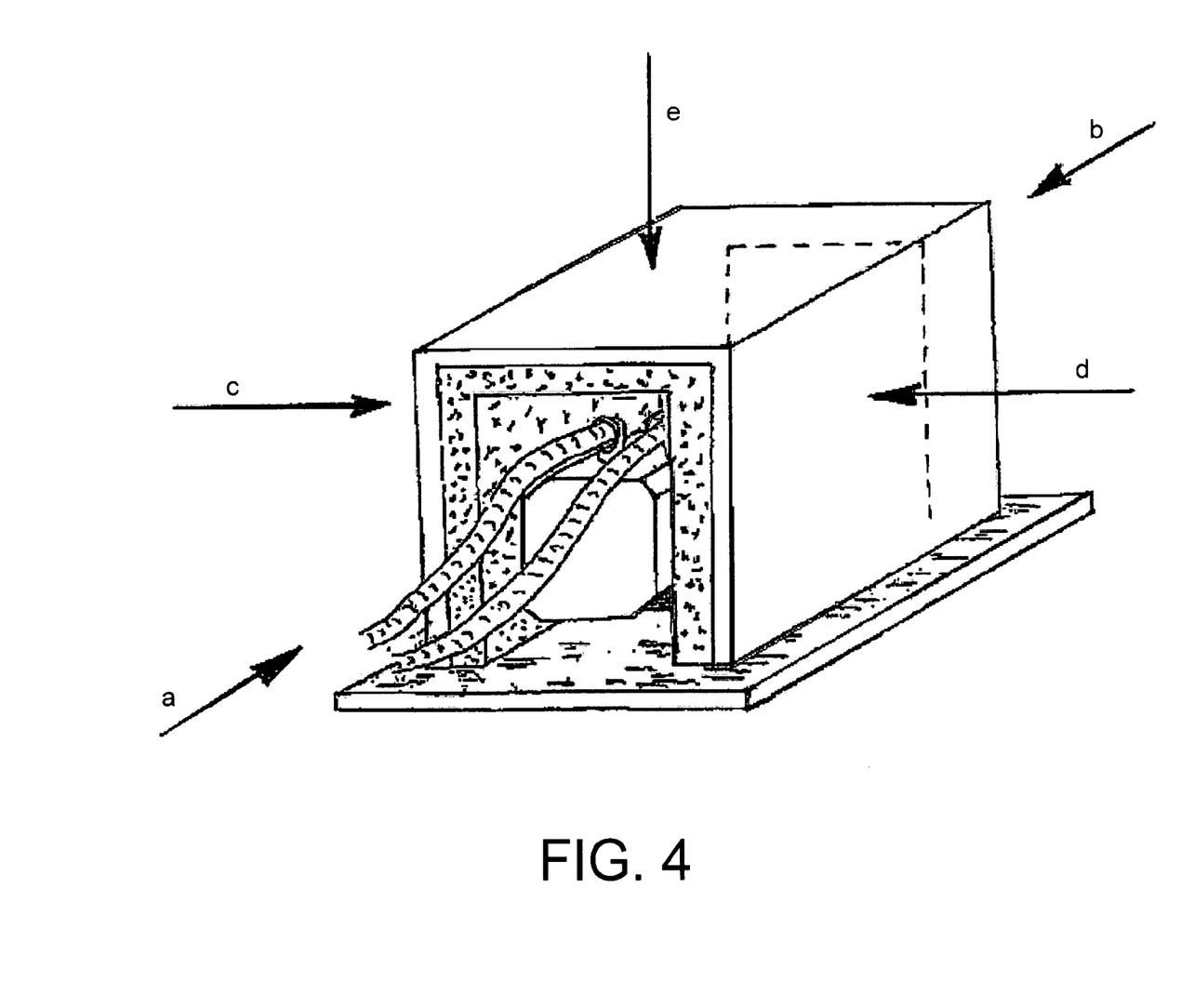
FIG. 4 shows a schematic perspective view of the noise reducing enclosure of FIGS. 1 to 3 indicating the directions of measured noise.

The noise levels were measured using an exponentially averaging sound level meter at a distance of 1 meter and the measurements were A-weighted according to the ISO standard method. The directions a, b, c, d and e in which the noise was measured are shown in FIG. 4. It can be seen that the noise levels without the enclosure 2 around the pump were inherently lower in the axial directions a and b than in the radial directions c, d and e. With the enclosure 2 in place, there was a substantial reduction (at least 90% reduction) in the radially emitted noise along with significant reduction in the axially emitted noise.

TABLE

Noise levels with and without enclosure.

| Direction of measured noise | Noise without enclosure [dB/A] | Noise with enclosure [dB/A] | Noise reduction [dB/A] | Noise reduction (%) |
| --- | --- | --- | --- | --- |
| a | 64 | 62 | −2 | ~37 |
| b | 62 | 59 | −3 | 50 |
| c | 67 | 55 | −12 | ~94 |
| d | 65 | 55 | −10 | 90 |
| e | 68 | 56 | −12 | ~94 |

Figure 5:
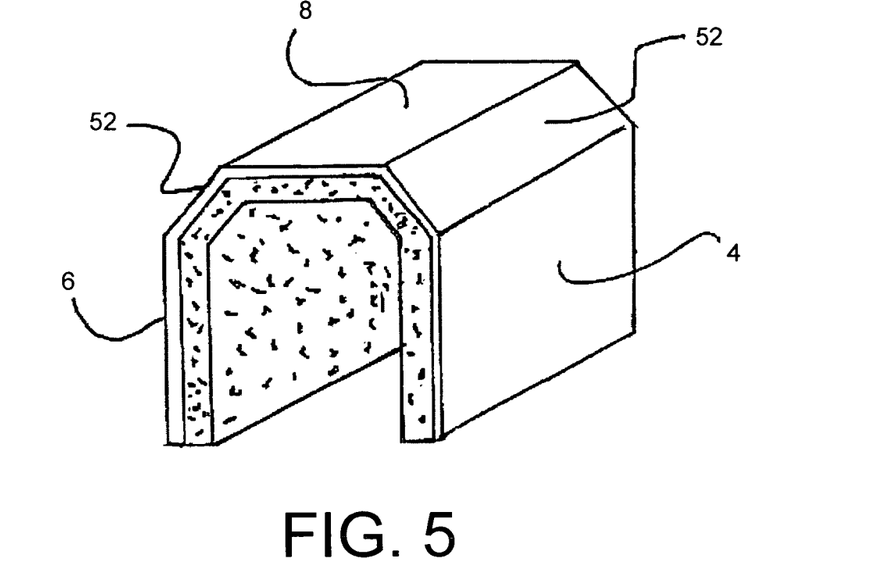
FIG. 5 shows a schematic perspective view of another embodiment of a noise reducing enclosure according to the present invention.
Figure 6:
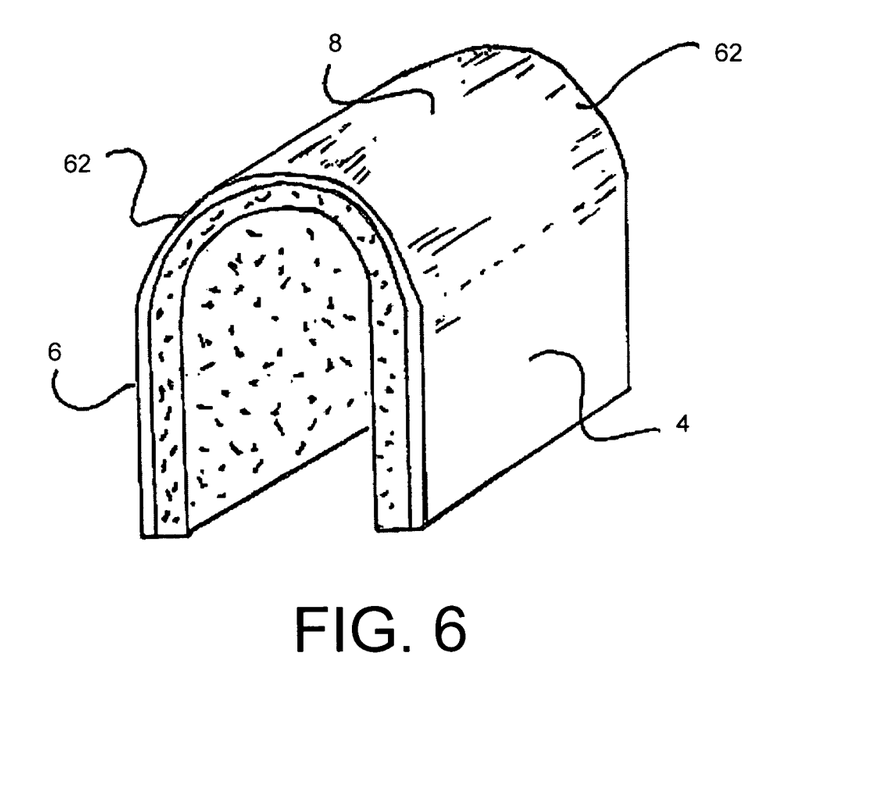
FIG. 6 shows a schematic perspective view of a further embodiment of a noise reducing enclosure according to the present invention.
Figure 7:
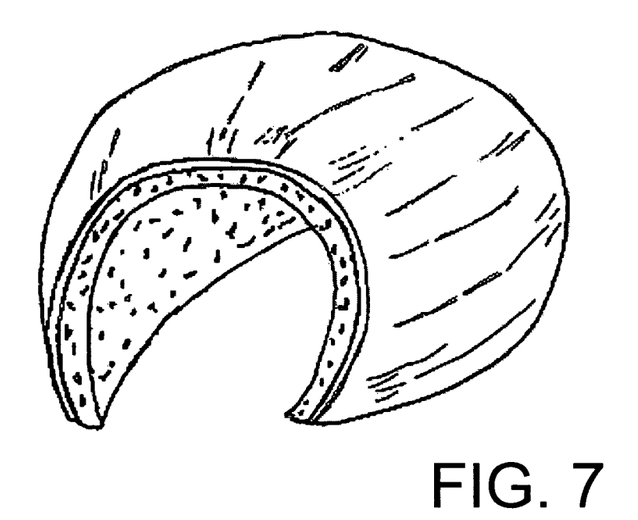
FIG. 7 shows a schematic perspective view of a still further embodiment of a noise reducing enclosure according to the present invention.

FIGS. 5 to 7 show examples of alternative enclosure shapes. FIG. 5 shows a chamfered U-shape enclosure substantially the same as the enclosure 2 shown in FIG. 1 but having chamfered edges 52 in place of the right angled edges 12. FIG. 6 shows a rounded U-shape enclosure substantially the same as the enclosure 2 shown in FIG. 1 but having rounded edges 62 in place of the right angled edges 12. FIG. 7 shows a bubble shaped enclosure. Other shapes can, of course, be chosen.

Figure 8:
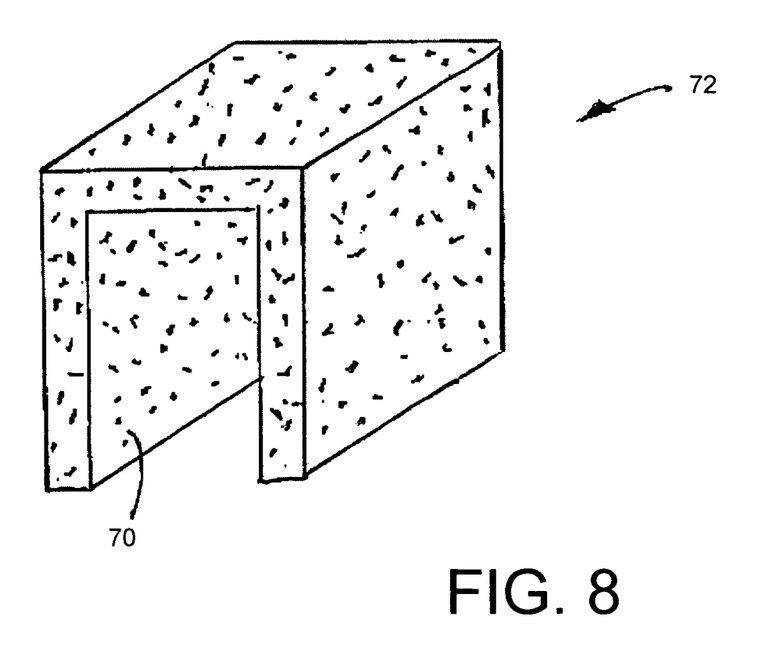
FIG. 8 shows a schematic perspective view of an alternative construction of a noise reducing enclosure according to the present invention.

Any of the shapes of enclosure may be alternatively constructed without having the outer sheet material 14 and instead may be made solely from the noise dampening material 10. For example, FIG. 8 shows an alternate construction of enclosure of substantially the same shape as the enclosure in FIG. 1 in which an enclosure 72 is constructed solely of a moulded piece of noise dampening material 70.

Figure 9:
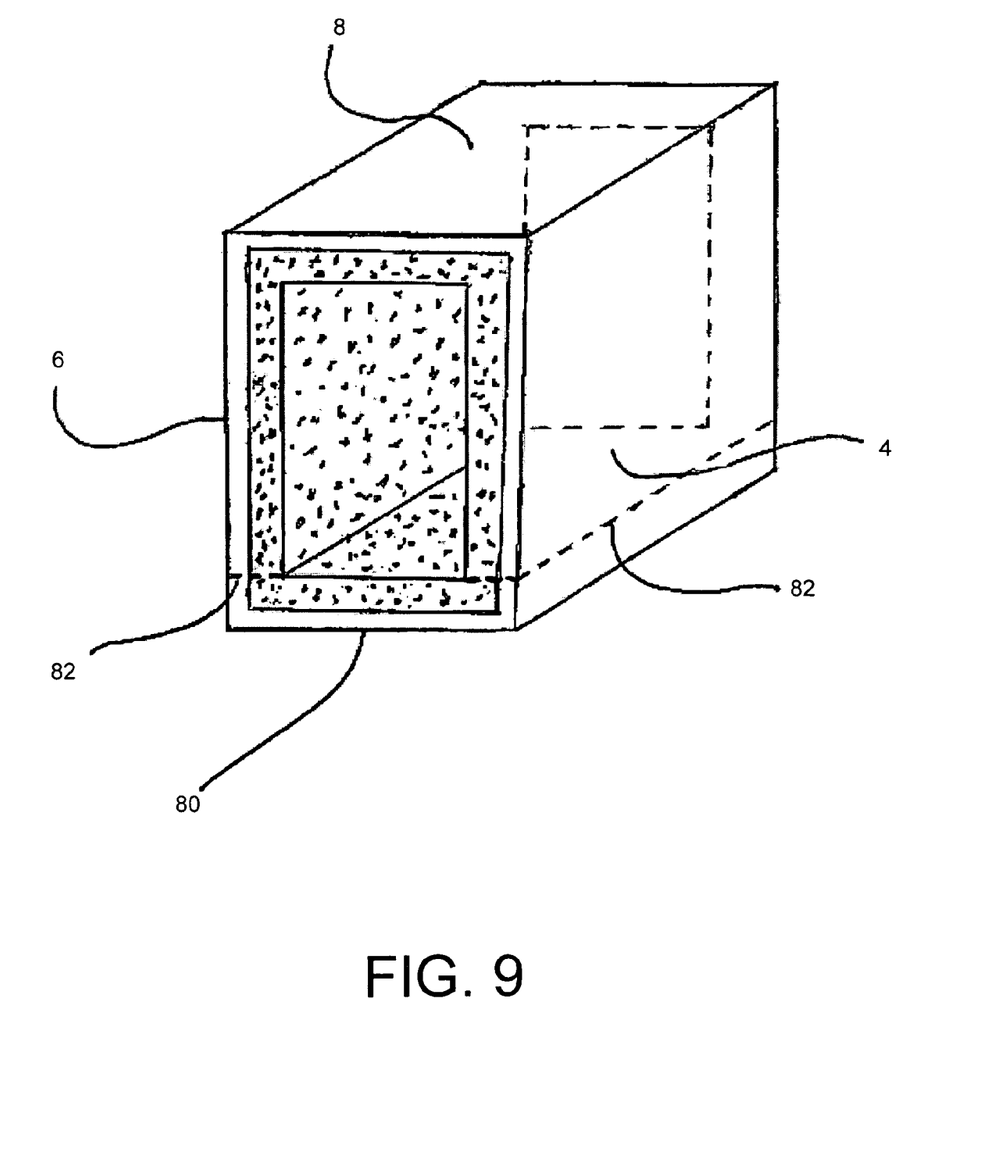
FIG. 9 shows a schematic perspective view of an embodiment of a noise reducing enclosure according to the present invention having a base.

As an alternative to the radially discontinuous enclosure shapes shown in FIGS. 1 to 8, wherein the enclosure engages with a support surface to fully radially enclose the vacuum pump, the enclosure may be radially continuous, e.g. additionally having an integral base or reversibly detachable base, as shown in FIG. 9. In FIG. 9, a base 80 is shown attached to the remainder of the enclosure, which is substantially as shown in FIG. 1. The base 80 can be integral (e.g. made as one piece with the remainder of the enclosure) or it may be detachable so that the remainder of the enclosure may be lifted off the base 80 to allow access to the pump inside. The base 80 could be made detachable, for example along the dotted line 82 shown in FIG. 9.

Figure 10:
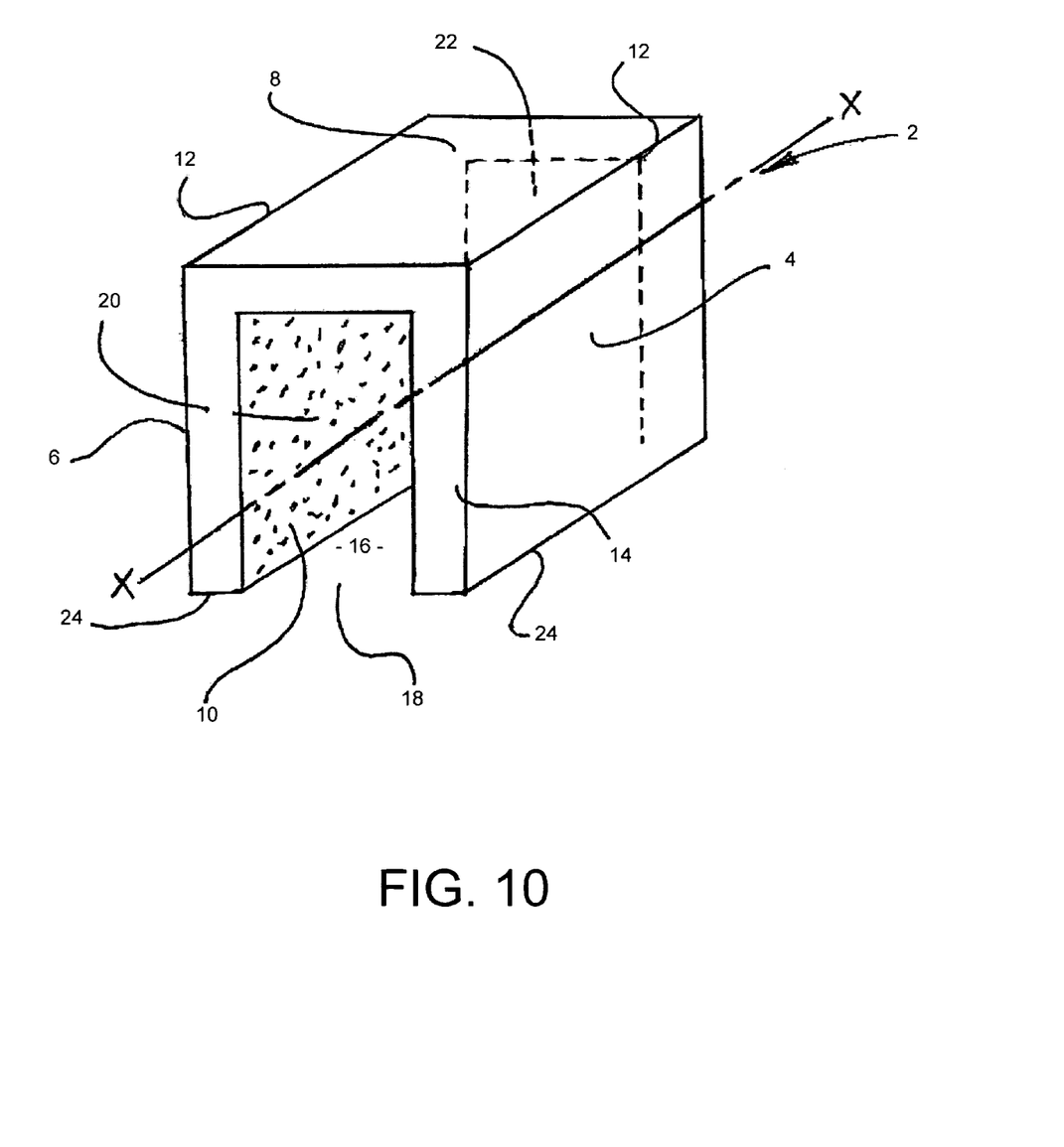
FIG. 10 shows an embodiment generally as shown in FIG. 1 but having outer sheet material covering the noise dampening material at the ends.

In many embodiments, the noise dampening material 10 is not exposed at the open ends of the enclosure but rather the outer sheet material 14 covers (e.g. is lapped over) the noise dampening material at the open ends so that only the outer sheet material 14 is visible on the end surfaces. This is illustrated in FIG. 10, which shows an embodiment generally as shown in FIG. 1 but having outer sheet material 14 covering the noise dampening material 10 at the ends.

Figure 11:
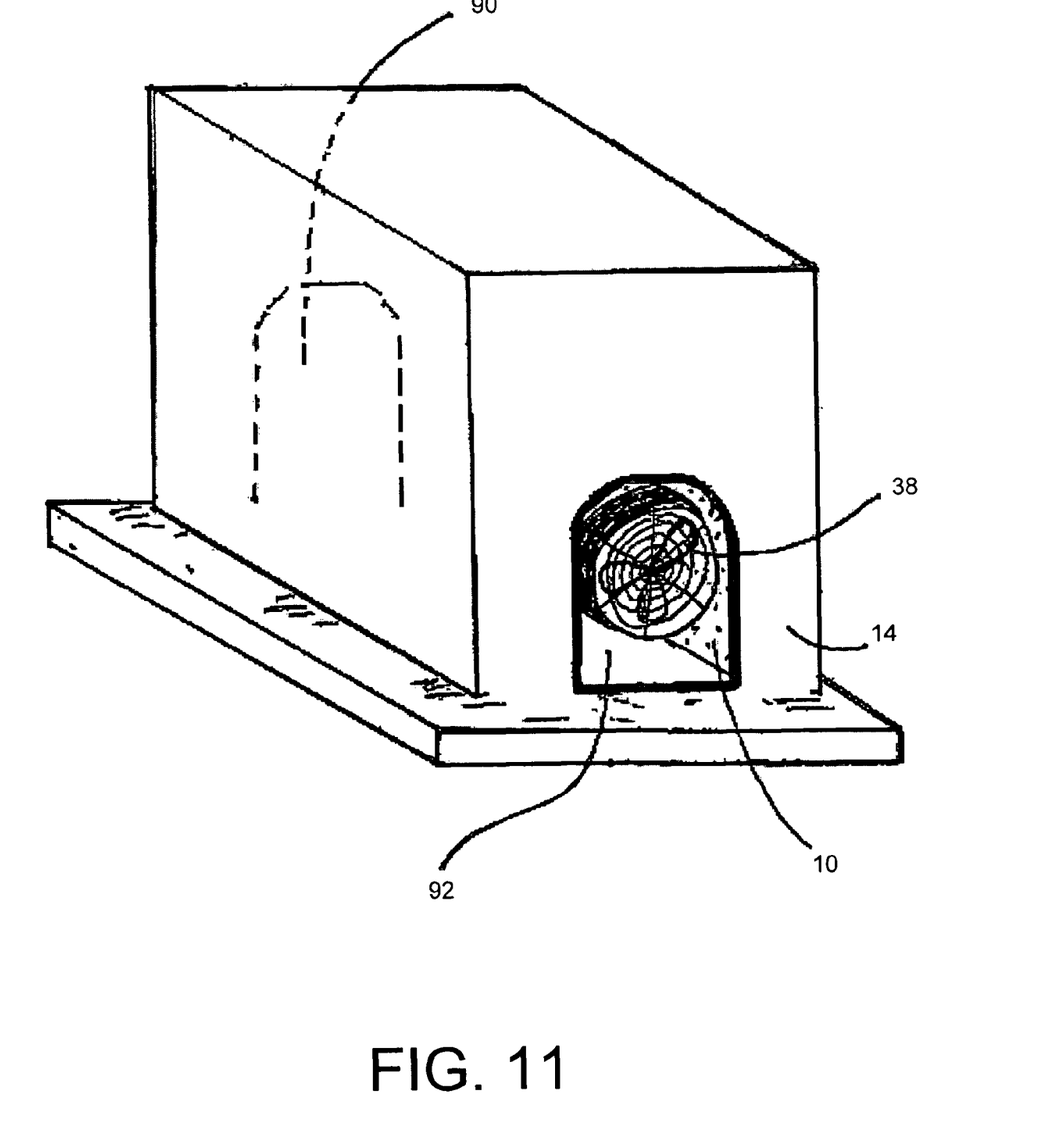
FIG. 11 shows an embodiment of a noise reducing enclosure according to the present invention having open ends with a reduced open area.

In FIG. 11 is shown an embodiment of an enclosure and assembly according to the present invention, generally corresponding to that shown in FIG. 3, but having more restricted open areas 90, 92 at its open ends (open area greater than 30% of the total end area). The open areas are generally of size to match the position and size of the pump's cooling fan 38.

Figure 12:
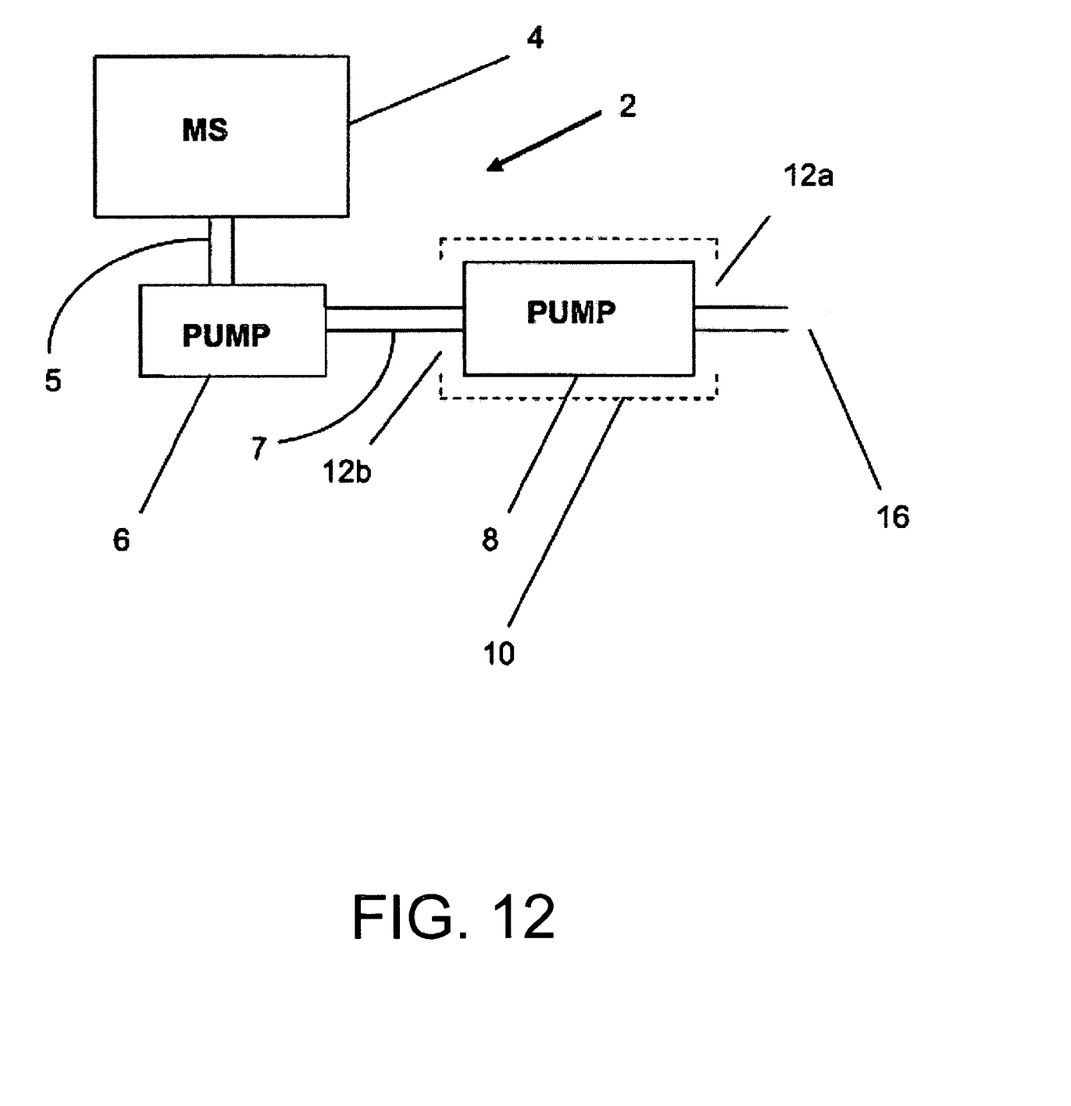
FIG. 12 shows a schematic diagram of a layout of a mass spectrometry system according an embodiment of the present invention.

In FIG. 12 is shown a schematic diagram of a layout of a mass spectrometry system 2 to which the present invention may have application. The system 2 comprises a mass spectrometer 4 having a plurality of internal chambers (not shown), including a chamber containing ion optics and an analysis chamber, which are maintained in operation at medium or high vacuum by means of high vacuum pump 6 in communication with the chambers by conduit 5. The pump 6 cannot easily pump from atmospheric pressure and for effective operation requires a roughing or low vacuum pump 8 which is in communication with high vacuum pump 6 by conduit 7 and has a vent 16. Pump 8 typically produces a lot of noise and is accordingly enclosed by an enclosure 10 in accordance with the invention. The enclosure 10 encloses the pump 8 radially along the entire axial length of the pump 8 with a small degree of overhang at each end. The enclosure 10 may be, for example, any of the enclosure designs shown in the preceding Figures. The enclosure 10 radially encloses the pump 8 but is axially open at each end 12a and 12b.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

Unless the context clearly indicates otherwise, as used herein plural forms of the terms herein are to be construed as including the singular form and vice versa.

Throughout the description and claims of this specification, the words "comprise", "including", "having" and "contain" and variations of the words, for example "comprising" and "comprises" etc, mean "including but not limited to", and are not intended to (and do not) exclude other components.

The use of any and all examples, or exemplary language (e.g., "for instance", "such as", "for example") provided herein, is intended merely to better illustrate the invention and does not indicate a limitation on the scope of the invention unless otherwise claimed. No language in the specification should be construed as indicating any non-claimed element as essential to the practice of the invention.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention claimed is:

1. A vacuum pumping assembly, comprising:
   a roughing vacuum pump in operation for a mass spectrometer comprising an elongated vacuum pump body with a top side and two elongated sides;
   a noise reducing vacuum pump enclosure comprising a rigid outer shell and a noise dampening inner lining, the enclosure extending along the major horizontal axis of the vacuum pump body between first and second axial ends, and;
   an air gap between the vacuum pump body and the inner lining of the enclosure of about 1 cm to 20 cm;
   wherein the enclosure substantially covers the top side and the two elongated sides of the vacuum pump body; and,
   wherein the enclosure is open at both of the first and second axial ends when the vacuum pump is in operation.

2. An assembly as claimed in claim 1 wherein the enclosure is longer than the pump.

3. An assembly as claimed in claim 1 wherein the enclosure is radially discontinuous.

4. An assembly as claimed in claim 3 wherein the enclosure has an open side by which the enclosure locates over the pump.

5. An assembly as claimed in claim 4 wherein the enclosure engages with a support surface on which the pump is supported.

6. An assembly as claimed in claim 1 wherein the enclosure has a U-shaped radial cross-section.

7. An assembly as claimed in claim 1 wherein the enclosure comprises an outer shell of a rigid material and an inner lining of noise dampening material.

8. An assembly as claimed in claim 7 wherein the rigid material comprises sheet metal or plastic.

9. A method for reducing the noise from a vacuum pump, the method comprising:
   operating a roughing vacuum pump for a mass spectrometer, the pump having an elongated vacuum pump body with a top side and two elongated sides;
   substantially covering the top side and the two elongated sides of the vacuum pump body with a noise reducing vacuum pump enclosure having a rigid outer shell and a noise dampening inner lining, the enclosure extending along the major horizontal axis of the vacuum pump body between first and second axial ends, the enclosure being open at its two axial ends when the pump is in operation; and,
   providing an air gap between the vacuum pump body and the inner lining of the enclosure of about 1 cm to 20 cm.

10. A method as claimed in claim 9 wherein the enclosure radially encloses the pump along substantially the whole of the length of the pump.

11. A method as claimed in claim 9 wherein the enclosure overhangs the ends of the pump.

12. A method as claimed in claim 9 wherein the pump has cooling means located at one end of the pump which generates an airflow along the pump length.

13. A mass spectrometry system, comprising:
   a mass spectrometer having at least one chamber held under vacuum during operation;
   a vacuum pumping system for producing the vacuum in the at least one chamber, the vacuum pumping system comprising at least one roughing vacuum pump body with a top side and two elongated sides;
   wherein the mass spectrometry system further comprises a noise reducing vacuum pump enclosure comprising a rigid outer shell and a noise dampening inner lining, the enclosure extending along the major horizontal axis of the vacuum pump body between first and second axial ends;

wherein the enclosure substantially covers the top side and the two elongated sides of the vacuum pump body, and maintains an air gap between the vacuum pump body and the inner lining of the enclosure of about 1 cm to 20 cm; and, wherein the enclosure is open at its two axial ends when the pump is in operation.

14. A method as claimed in claim 13 wherein the enclosure allows an air gap to exist between the pump and the inner surface of the enclosure.

* * * * *